United States Patent
Takagi et al.

(10) Patent No.: US 7,483,514 B2
(45) Date of Patent: Jan. 27, 2009

(54) X-RAY IMAGING METHOD AND X-RAY IMAGING SYSTEM

(75) Inventors: Shin-ichiro Takagi, Hamamatsu (JP); Kazuhisa Miyaguchi, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 11/635,783

(22) Filed: Dec. 8, 2006

(65) Prior Publication Data

US 2008/0116380 A1 May 22, 2008

(30) Foreign Application Priority Data

Nov. 21, 2006 (JP) ............................ P2006-314616

(51) Int. Cl.
*A61B 6/00* (2006.01)
(52) U.S. Cl. .................................. 378/98.12
(58) Field of Classification Search .............. 378/98.11, 378/98.12
See application file for complete search history.

(56) References Cited

U.S. PATENT DOCUMENTS 5,519,751 A * 5/1996 Yamamoto et al. ......... 378/98.8

2002/0150306 A1* 10/2002 Baron ........................ 382/275

FOREIGN PATENT DOCUMENTS

| JP | 6-125887 | 5/1994 |
|---|---|---|
| JP | 8-33922 | 3/1996 |
| JP | 11-134490 | 5/1999 |
| JP | 2001-330678 | 11/2001 |
| JP | 2003-008988 | 1/2003 |

OTHER PUBLICATIONS

Translation of JP 11-134490 published May 21, 1999.*

* cited by examiner

*Primary Examiner*—Chih-Cheng G Kao
(74) *Attorney, Agent, or Firm*—Drinker Biddle & Reath LLP

(57) ABSTRACT

An X-ray imaging system is constituted of: an X-ray imaging device that includes a scintillator, which converts an X-ray image to an optical image, and an imaging element, which acquires an X-ray observed image by detecting the optical image generated by the scintillator; a first subtracter that performs a subtraction process between a first X-ray observed image, which contains a first noise image component, and a second X-ray observed image, which contains a second noise image component, to generate a noise image; a threshold value processing circuit that performs a threshold value process on the noise image to extract the first noise image component; and a second subtracter that subtracts the extracted first noise image component, from the first X-ray observed image to generate a noise-removed image.

4 Claims, 12 Drawing Sheets

Fig.4
(a)
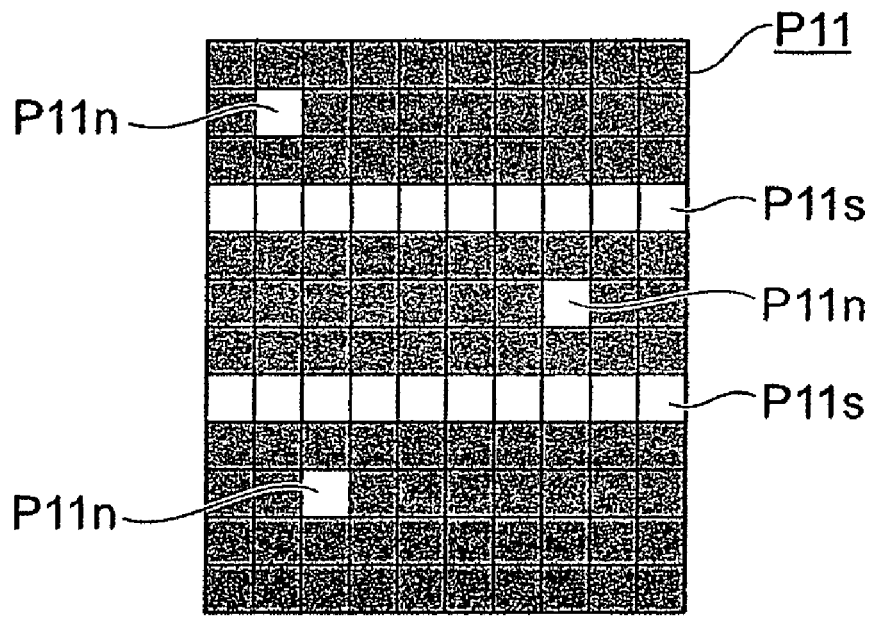
(b)
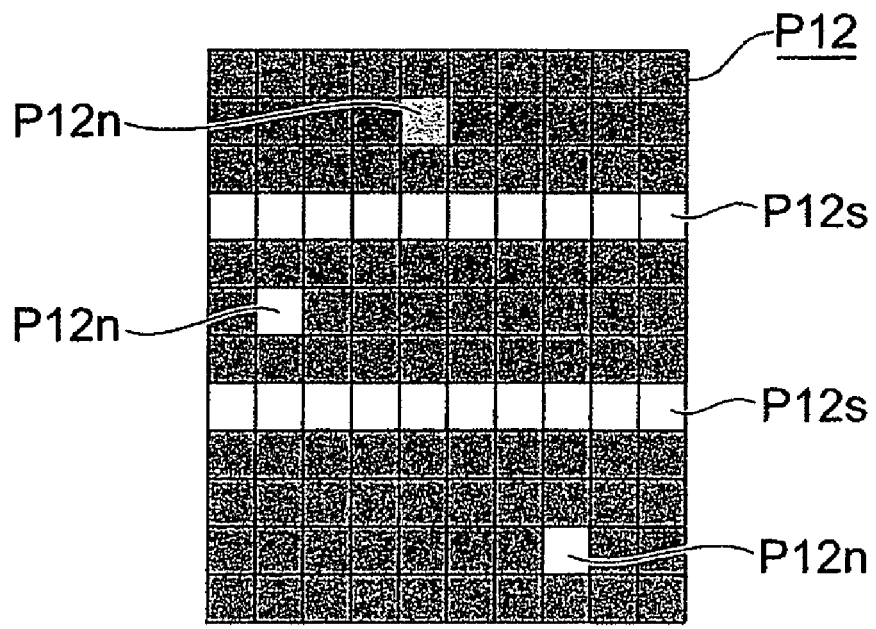

Fig.5
(a)
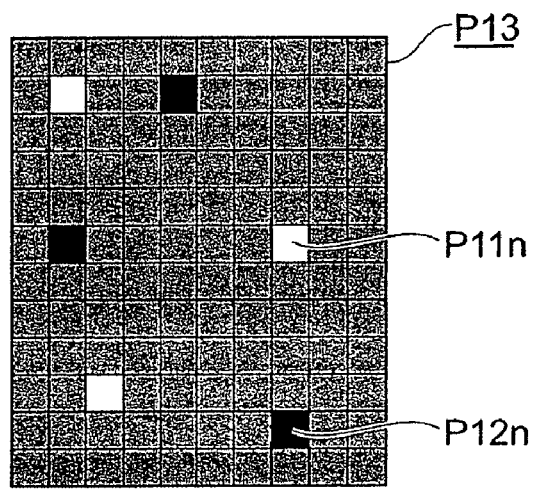
(b)
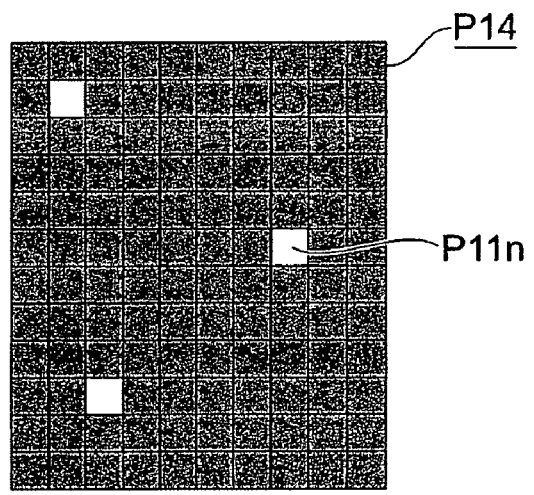
(c)
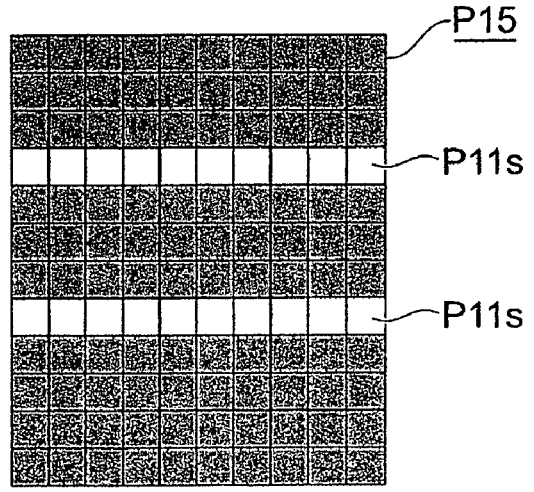

Fig.6
(a)
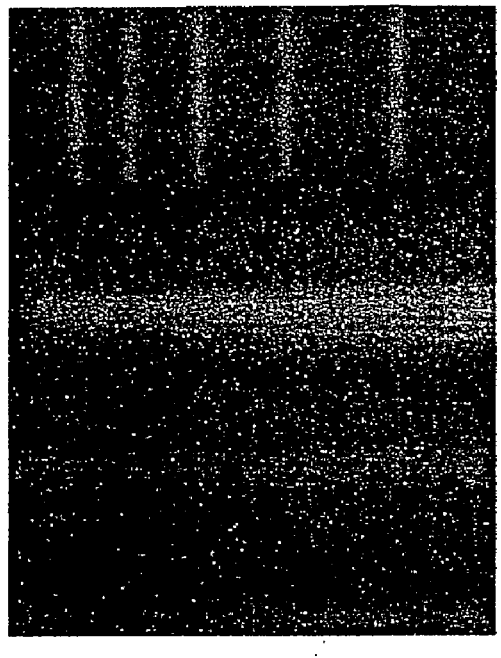
(b)
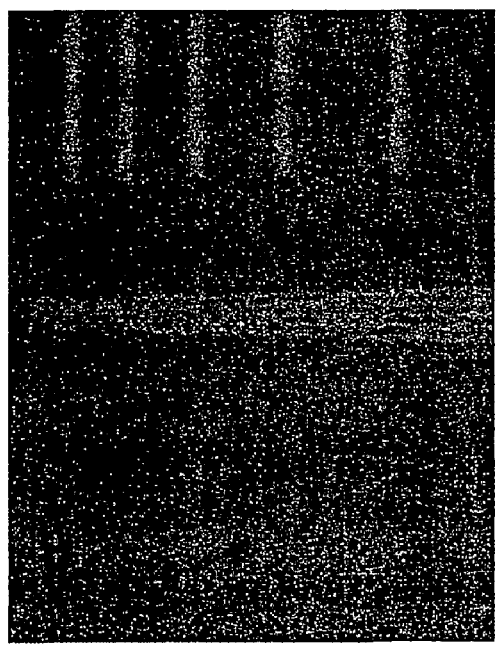

Fig.10
(a)
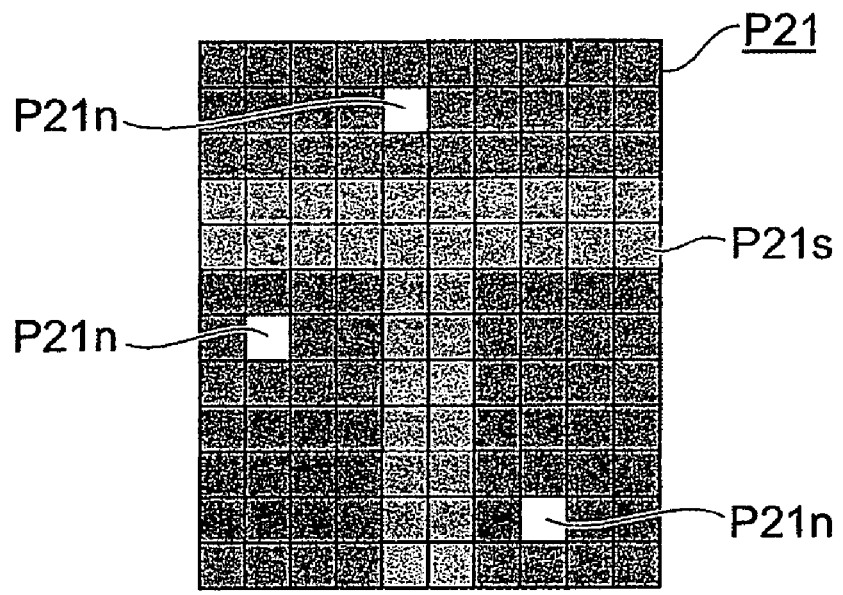
(b)
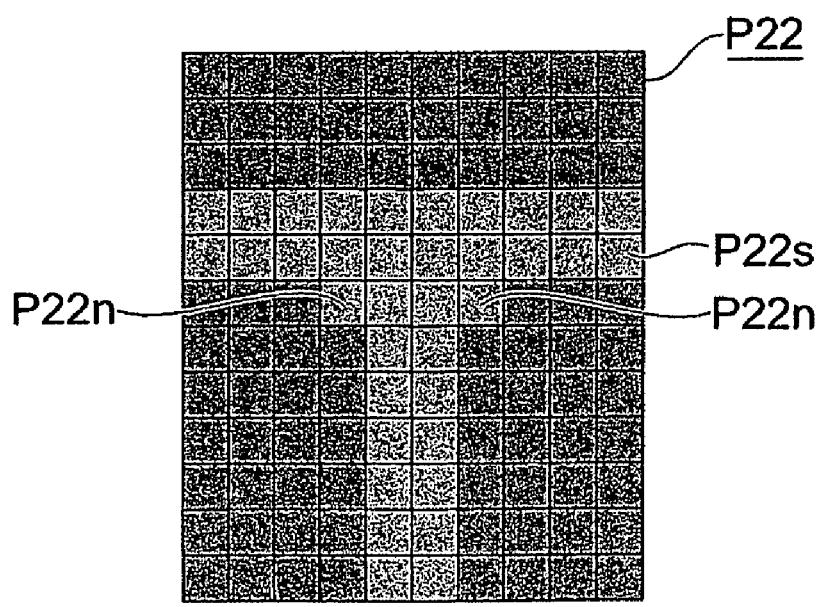

Fig.11
(a)
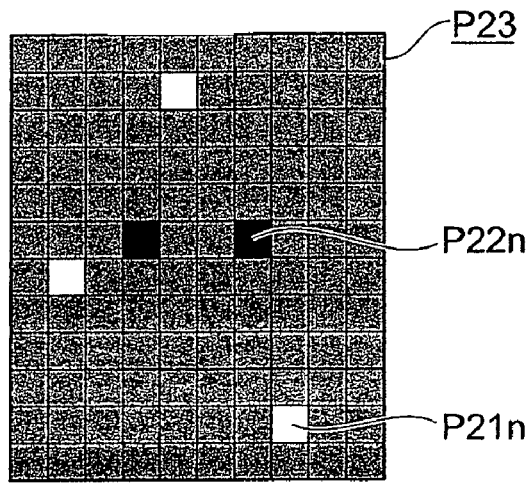
(b)
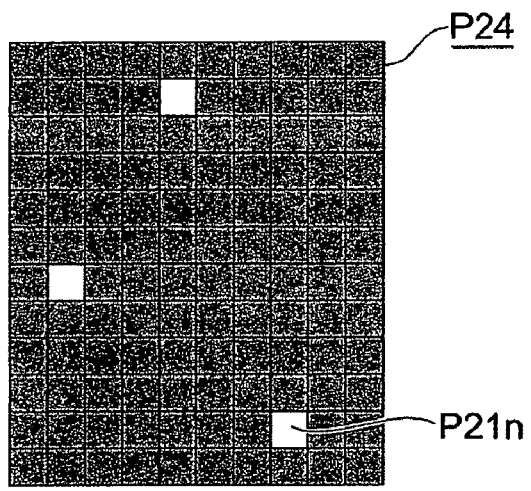
(c)
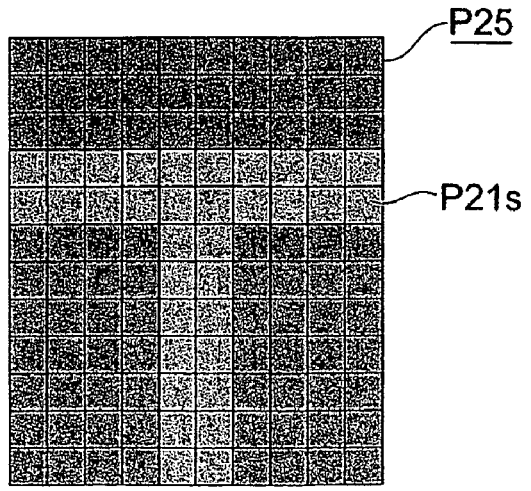

Fig.12
(a)
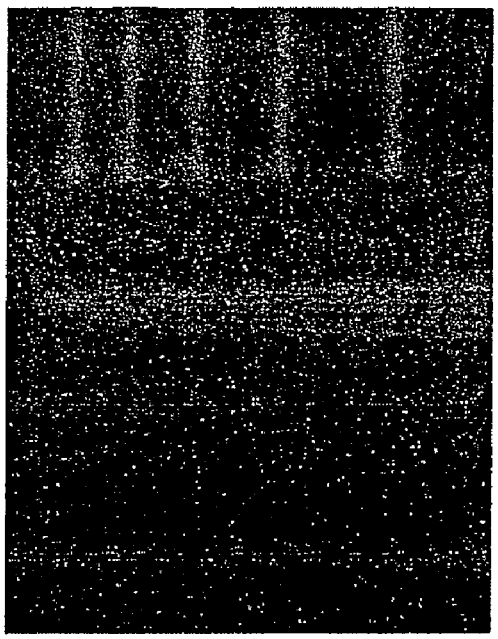
(b)
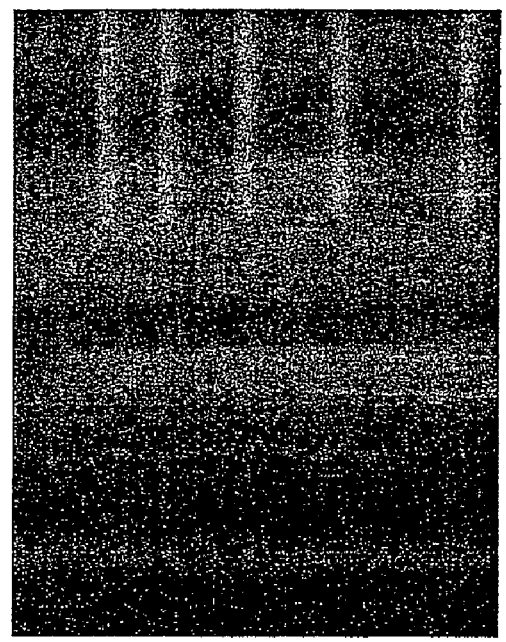
(c)
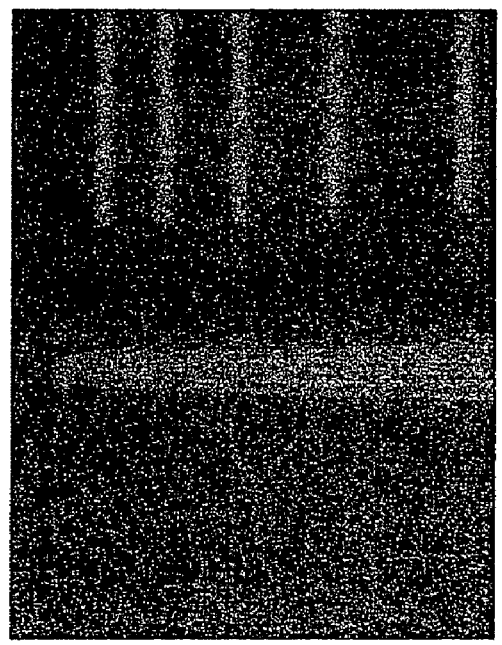

X-RAY IMAGING METHOD AND X-RAY IMAGING SYSTEM

BACKGROUND OF THE INVENTION

1. Field of the Invention

The present invention relates to an X-ray imaging method and an X-ray imaging system for acquiring an X-ray observed image corresponding to an X-ray image made incident on an X-ray imaging device.

2. Related Background Art

Recently with X-ray imaging devices for medical use, etc., the use of X-ray imaging devices that combine a scintillator and a CCD or other imaging element is progressing. With such an imaging device, incident X-rays are converted to scintillating light of predetermined wavelength (for example, visible light) in accordance with the X-ray amount at the scintillator. By an optical image resulting from the scintillating light being then detected by the imaging element, an X-ray observed image corresponding to an X-ray image is acquired (see, for example, Patent Document 1: Japanese Patent Application Laid-Open No. 2001-330678).

SUMMARY OF THE INVENTION

In some case with an X-ray imaging device of the above-described arrangement, combining a scintillator and an imaging element, a portion (for example, approximately 10%) of the X-rays of the incident X-ray image is transmitted through the scintillator without being converted to scintillating light and directly detected by the imaging element. Such transmitted X-rays appear as bright spot noise in the X-ray observed image output from the imaging element. Noise image components due to the bright spot noise generally have higher signal outputs than image components due to X-rays converted to scintillating light and are a cause of degradation of the image quality of the acquired X-ray observed image.

In regard to this, use of a recursive filter and a median filter or other smoothing filter to reduce noise components in an image is described in Patent Document 2: Japanese Patent Publication No. H8-33922. However, with a method using a recursive filter, because a large number of X-ray observed images, acquired for the same subject, are summed upon being weighed appropriately to reduce the effects of noise image components, a long imaging time is required to acquire the large number of images and residual images are formed due to movement of the subject, etc. There is also the problem that the X-ray exposure of the subject increases. Also with the method of using a smoothing filter, the smoothing causes blurring of outlines in the subject image itself and degradation of resolution cannot be avoided.

The present invention has been made to resolve the above problems, and an object thereof is to provide an X-ray imaging method and an X-ray imaging system that enable an X-ray observed image, corresponding to an incident X-ray image, to be acquired favorably in a state in which the effects of noise image components are reduced.

In order to achieve the above object, the present invention provides an X-ray imaging method (1) using an X-ray imaging device that includes a scintillator, one surface of which is an X-ray incident surface and which generates scintillating light in accordance with incident X-rays to convert an X-ray image to an optical image, and an imaging element, which is disposed so as to face the other surface of the scintillator and detects the optical image generated by the scintillator to acquire an X-ray observed image corresponding to the X-ray image made incident on the scintillator, and includes: (2) a first image acquisition step of acquiring, by means of the X-ray imaging device, a first X-ray observed image that contains an image component, corresponding to the X-ray image converted to the optical image by the scintillator, and a first noise image component, due to X-rays made directly incident on the imaging element; (3) a second image acquisition step of acquiring a second X-ray observed image that contains a second noise image component differing from the first noise image component; (4) a subtraction processing step of performing a subtraction process between the first X-ray observed image and the second X-ray observed image to generate a noise image into which the noise image components are extracted; (5) a threshold value processing step of performing a threshold value process on the noise image to extract the first noise image component among the noise image components; and (6) a noise removal step of subtracting the first noise image component, extracted in the threshold value processing step, from the first X-ray observed image, containing the first noise image component, to generate a noise-removed image, with which the first noise image component is removed.

An X-ray imaging system according to the present invention includes: (a) an X-ray imaging device, including a scintillator, one surface of which is an X-ray incident surface and which generates scintillating light in accordance with incident X-rays to convert an X-ray image to an optical image, and an imaging element, which is disposed so as to face the other surface of the scintillator and detects the optical image generated by the scintillator to acquire an X-ray observed image corresponding to the X-ray image made incident on the scintillator; (b) subtraction processing means, performing a subtraction process between a first X-ray observed image, which is acquired by means of the X-ray imaging device and contains an image component, corresponding to the X-ray image converted to the optical image by the scintillator, and a first noise image component, due to X-rays made directly incident on the imaging element, and a second X-ray observed image, which is acquired so as to contain a second noise image component differing from the first noise image component, to generate a noise image, into which the noise image components are extracted; (c) threshold value processing means, performing a threshold value process on the noise image to extract the first noise image component among the noise image components; and (d) noise removal means, subtracting the first noise image component, extracted by the threshold value processing means, from the first X-ray observed image that contains the first noise image component to generate a noise-removed image, with which the first noise image component is removed.

With the above-described X-ray imaging method and X-ray imaging system, first and second X-ray observed images, which differ from each other in conditions concerning the noise image components, are acquired for an imaging object X-ray image, resulting, for example, from X-rays transmitted through a subject. Between these images, whereas the image components corresponding to the X-ray image converted to the optical image by the scintillator are basically matched and are canceled out by subtraction, in regard to the noise image components, the positions of occurrence, distribution, etc., differ according to the image.

Thus by performing a subtraction process on the first and second X-ray observed images and furthermore performing an appropriate threshold value process, just the noise image component contained in the first X-ray observed image can be selectively extracted. By then subtracting the extracted noise image component from the original X-ray observed image, an image, with which the effect of the noise image component due to X-rays that are made directly incident on the imaging element is reduced, can be acquired favorably and efficiently.

With the X-ray imaging method and X-ray imaging system according to the present invention, by acquiring first and second X-ray observed images, which differ from each other in conditions concerning the noise image components, for an X-ray image of an imaging object, performing a subtraction process between the first and second X-ray observed images, furthermore performing an appropriate threshold value process to extract the noise image component, and then performing noise removal of the X-ray observed image, an X-ray observed image, corresponding to the incident X-ray image, can be acquired favorably in a state in which the influence of the noise image component is reduced.

BRIEF DESCRIPTION OF THE DRAWINGS

FIG. 4 shows schematic views showing a noise removal method for an X-ray observed image;

FIG. 5 shows schematic views showing a noise removal method for an X-ray observed image;

FIG. 6 is a diagram showing an example of an X-ray observed image (a) and a noise-removed image (b);

FIG. 10 shows schematic views showing a noise removal method for an X-ray observed image;

FIG. 11 shows schematic views showing a noise removal method for an X-ray observed image; and FIG. 12 is a diagram showing an example of an X-ray observed image (a), a smoothed image (b), and a noise-removed image (c).

DESCRIPTION OF THE PREFERRED EMBODIMENTS

Figure 1:
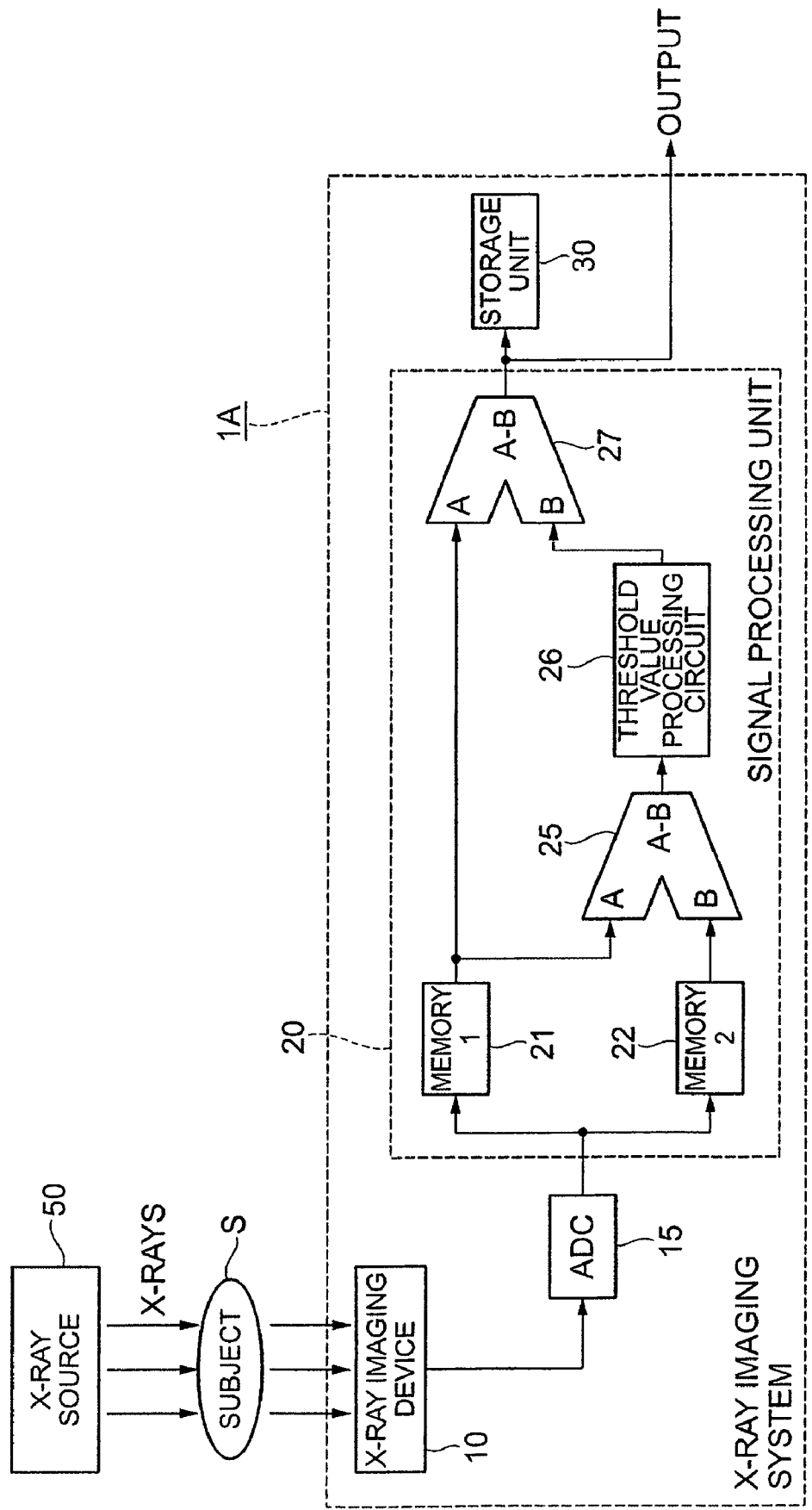
FIG. 1 is a block diagram showing an arrangement of a first embodiment of an X-ray imaging system.

Preferred embodiments of an X-ray imaging method and an X-ray imaging system according to the present invention shall now be described in detail along with the drawings. In the description of the drawings, elements that are the same shall be provided with the same symbol and redundant description shall be omitted. The dimensional proportions in the drawings do not necessarily match those of the description.

Figure 2:
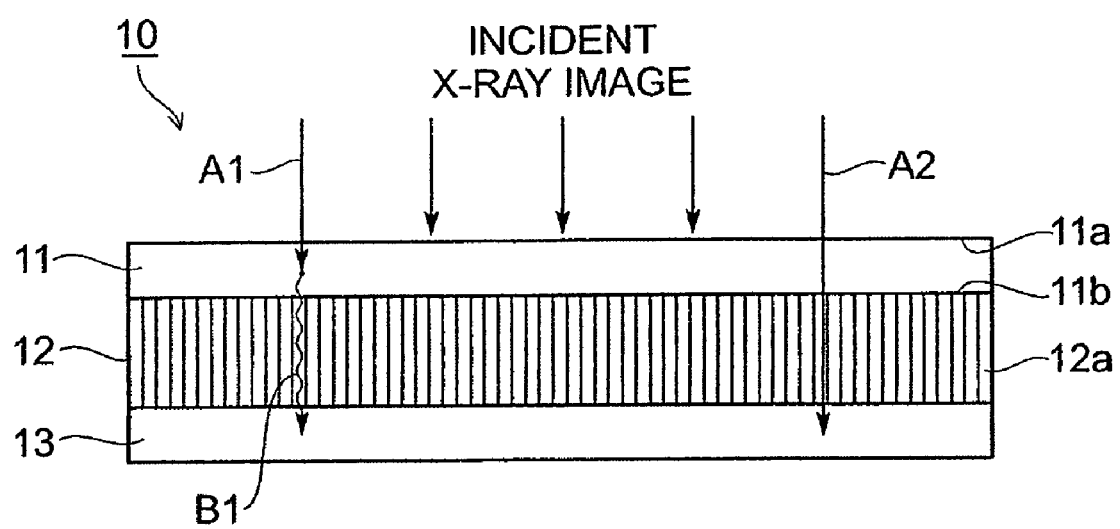
FIG. 2 is a side view showing an arrangement of an X-ray imaging device used in the X-ray imaging system.

FIG. 1 is a block diagram of an arrangement of a first embodiment of an X-ray imaging system according to the present invention. FIG. 2 is a schematic side view of an arrangement of an X-ray imaging device used in the X-ray imaging system. The X-ray imaging system 1A according to this embodiment includes the X-ray imaging device 10, an ADC (A/D converter) 15, a signal processing unit 20, and a storage unit 30. FIG. 1 shows an example, in which a subject S is irradiated with X-rays from an X-ray source 50, and an X-ray image, generated by the X-rays transmitted through the subject S, is the object of imaging by the X-ray imaging system 1A.

The X-ray imaging device 10 is image acquisition means for acquiring an X-ray observed image corresponding to the incident X-ray image and, as shown in FIG. 2, includes a scintillator 11, a fiber optic plate (FOP) 12, and an imaging element 13. The scintillator 11 is formed to a flat plate shaped form from a predetermined scintillation material, and one surface 11a thereof is an X-ray incident surface for incidence of the X-ray image. At the scintillator 11, scintillating light is generated in correspondence to the X-rays made incident from the X-ray incident surface 11a and the X-ray image of the imaging object is thereby converted to an optical image.

The imaging element 13 is disposed at the downstream side of the X-ray image incident direction with respect to the other surface 11b of the scintillator 11. The imaging element 13 detects the optical image generated by the scintillator 11 and thereby acquires the X-ray observed image corresponding to the X-ray image made incident on the scintillator 11. The data of the acquired X-ray observed image are output as analog image signals from the imaging element 13. As such an imaging element 13, for example, an imaging element, having an imaging unit arranged by forming a CCD on a planar, rectangular silicon substrate and being enabled to acquire two-dimensional images, can be used.

In the arrangement example shown in FIG. 2, the FOP 12 is furthermore disposed between the scintillator 11 and the imaging element 13. As shown schematically in FIG. 2, the FOP 12 is an optical element, enabled to transmit an optical image by bundling together a large number of optical fibers 12a, and functions as a fiber optic member that guides the optical image, due to the scintillating light generated in the scintillator 11 in correspondence to the incident X-ray image, to the imaging element 13.

The analog image signals of the X-ray observed image output from the imaging element 13 of the X-ray imaging device 10 are converted to digital image signals by the ADC 15 and thereafter input into the signal processing unit 20 as shown in FIG. 1. The signal processing unit 20 is signal processing means that performs predetermined image processes, such as a noise removal process, on the X-ray observed image acquired by the X-ray imaging device 10. The image data of the X-ray observed image, etc., processed by the signal processing unit 20 are stored in the storage unit 30 as necessary. Also, such processes as output to the exterior, display on a display device, printing, transmission to an external processing device, storage in an external storage device, etc., are performed as necessary on the image data.

In the present embodiment the noise removal process performed on the X-ray observed image at the signal processing unit 20 is performed using a first X-ray observed image, acquired by the X-ray imaging device 10, and a second X-ray observed image, acquired in succession to but at a different time from the first X-ray observed image (a time before or after the first X-ray observed image). In accordance with such a noise removal method, the signal processing unit 20, shown in FIG. 1, has a first memory 21, a second memory 22, a first subtracter 25, a threshold value processing circuit 26, and a second subtracter 27.

The first memory 21 and the second memory 22 are respectively enabled to store the image data of an X-ray observed image acquired by the X-ray imaging device 10. The first subtracter 25 is subtraction processing means that uses input image signals from the first memory 21 as signals A and input image signals from the second memory 22 as signals B and performs a subtraction process of A-B. The threshold value processing circuit 26 is threshold value processing means that performs a predetermined threshold value process on the subtracted image signals A-B output from the first subtracter

25. The second subtracter 27 is noise removal means that uses the input image signals from the first memory 21 as signals A and input image signals from the threshold value processing circuit 26 as signals B and performs a subtraction process of A-B to perform noise removal. Though, for the sake of description, an arrangement example of using a plurality of memories is described here, the X-ray observed images do not necessarily have to be stored in different memories, and an arrangement of performing the same processes upon storage in a single external storage device, such as a bard disk, etc., is also possible.

Figure 3:
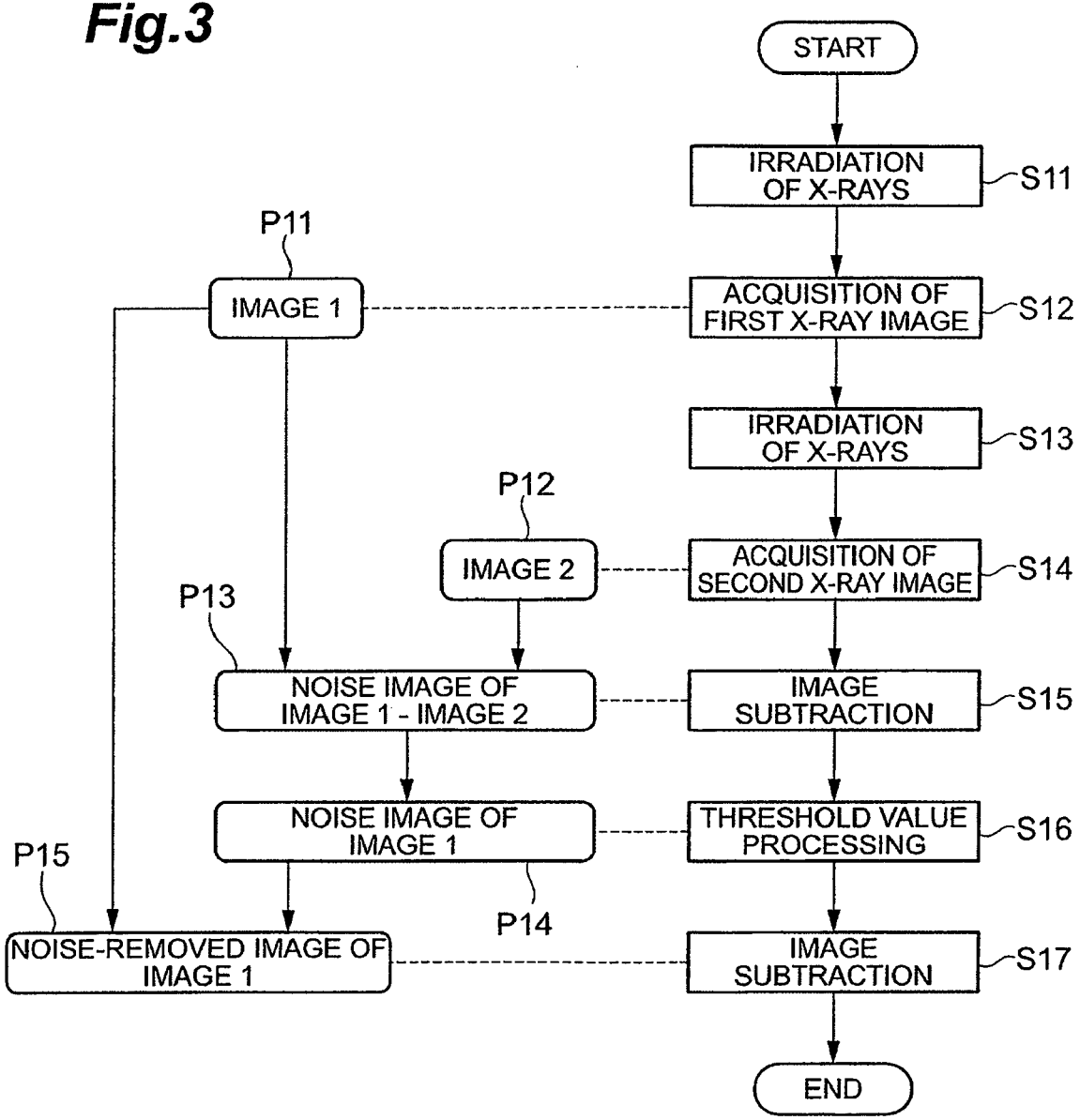
FIG. 3 is a flowchart showing a first embodiment of an X-ray imaging method.

A method for removing the noise in the X-ray observed image that is implemented in the X-ray imaging system 1A, shown in FIG. 1, shall now be described with reference to FIG. 3. FIG. 3 is a flowchart of a first embodiment of an X-ray imaging method according to the present invention. FIG. 4 and FIG. 5 show schematic views of the noise removal method in the X-ray imaging method shown in FIG. 3.

Here, as shown schematically in FIG. 2, an X-ray observed image acquired by the X-ray imaging device 10 contains an image component, resulting from the conversion of incident X-rays A1 to scintillating light B1 by the scintillator 11 and the detection of the scintillating light B1 by the imaging element 13, and a noise image component, resulting from incident X-rays A2 that are transmitted through the scintillator 11 and detected directly by the imaging element 13. Here, the former image component is the image component corresponding to the incident X-ray image converted to the optical image by the scintillator 11, that is, the image component corresponding to the imaging object. In the description that follows, the image component corresponding to the imaging object shall be referred to as a "signal image component" in contrast to the above-described "noise image component".

In the X-ray imaging method shown in FIG. 3, first, the subject S (see FIG. 1) is irradiated with X-rays from the X-ray source 50 (step S11), and a first X-ray observed image P11 is acquired by means of the X-ray imaging device 10 and the image data are stored in the first memory 21 of the signal processing unit 20 (S12, first image acquisition step). As shown in (a) in FIG. 4, this first image P11 contains signal image components P11s, corresponding to the image of the subject S, and first noise image components P11n, due to X-rays made directly incident on the imaging element 13. The noise image components P11n are distributed intermittently on the image P11 as bright spot noise.

When the acquisition of the first X-ray observed image P11 is ended, the subject S is irradiated with X-rays from the X-ray source 50 again (S13) to acquire a second X-ray observed image P12 by means of the X-ray imaging device 10 and the image data are stored in the second memory 22 of the signal processing unit 20 (S14, second image acquisition step). As shown in (b) in FIG. 4, this second image P12 contains signal image components P12s, corresponding to the image of the subject S, and second noise image components P12n, due to the directly incident X-rays. Here, because the images P11 and P12 are images acquired at different times, the second noise image components P12n contained in the image P12 and the first noise image components P11n contained in the image P11 normally differ in the positions of noise occurrence, etc. Meanwhile, the signal image components P11s and P12s, corresponding to the image of the subject S, are substantially matched between the images P11 and P12.

The first subtracter 25 then performs a subtraction process of P11-P12 between the first image P11 stored in the memory 21, and the second image P12 stored in the memory 22 (S15, subtraction processing step). In this process, the signal image components P11s and P12s that are contained in the images P11 and P12 are canceled out by the subtraction, with the exception of components of data fluctuation, etc., between the imagings. A noise image P13, into which the noise image components of image 1—image 2 are extracted, is thus generated. As shown in (a) in FIG. 5, in the noise image P13, the first noise image components P11n are image components having positive intensity values (indicated by white pixels in the figure) and the second noise image components P12n are image components having negative intensity values (indicated by black pixels).

On intensity values of the respective pixels in such a noise image P13, the threshold value process is performed at the threshold value processing circuit 26 by setting an appropriate, positive intensity value as a threshold value for discriminating noise image components (S16, threshold value processing step). The second noise image components P12n, having negative intensity values in the noise image P13, and image components that contain just the fluctuation of the intensity values between respective imagings, etc., are thereby eliminated, and an image P14, into which the first noise image components P11n, having positive intensity values, are selectively extracted, is generated as shown in (b) in FIG. 5.

The second subtracter 27 then subtracts the first noise image components P11n (FIG. 5(b)), extracted at the threshold value processing circuit 26, from the first X-ray observed image P11 (FIG. 4(a)), containing the signal image components P11s and the first noise image components P11n. A noise-removed image P15, with which the noise image components P11n have been removed from the first X-ray observed image P11, is thereby obtained as shown in (c) in FIG. 5 (S17, noise removal step).

The effects of the X-ray imaging method and the X-ray imaging system according to the present embodiment shall now be described.

With the X-ray imaging method and the X-ray imaging system 1A shown in FIG. 1 to FIG. 5, the first and second X-ray observed images P11 and P12, which differ from each other in conditions concerning the noise image components, are acquired for the imaging object X-ray image resulting from the X-rays transmitted through the subject S. Between these images, the image components corresponding to the X-ray image converted to the optical image by the scintillator 11 are basically matched in position, intensity, etc., and are canceled out by subtraction. Meanwhile, in regard to the noise image components, such as the bright spot noise due to X-rays being detected directly by the imaging element 13, the positions of occurrence, distribution, etc., differ between the first image P11 and the second image P12.

Thus by performing the subtraction process by means of the subtracter 25 between the first and second X-ray observed images P11 and P12 and furthermore performing the appropriate threshold value process at the threshold value processing circuit 26, just the noise image components P11n contained in the first X-ray observed image P11 can be extracted selectively. By then subtracting the extracted noise image components P11n from the original X-ray observed image P11 by means of the subtracter 27, the noise-removed image, with which the effects of the noise image components due to X-rays made directly incident on the imaging element 13 are reduced, can be acquired favorably and efficiently.

Also with the present embodiment, as the specific method of acquiring the second X-ray observed image P12 used for removing noise from the first X-ray observed image P11, the method of acquiring the second X-ray observed image P12, containing the image components, corresponding to the X-ray image converted to the optical image by the scintillator 11, and the second noise image components, due to X-rays made directly incident on the imaging element 13, by means of the X-ray imaging device 10 is used. The removal of noise from the X-ray observed image by the above-described method can thus be realized favorably.

Because with such an arrangement, it is sufficient to acquire two X-ray observed images successively under substantially the same conditions, image acquisition can be performed efficiently in a short imaging time. The signal image components P1 is that are obtained in the final, noise-removed image are also those on which a smoothing process or other image process has not been performed. Thus with respect to the original X-ray observed image, there is no degradation of resolution, etc., due to an image processing.

The arrangement example shown in FIG. 2 also employs an arrangement, in the X-ray imaging device 10 for acquiring X-ray observed images, having the FOP 12, which is a fiber optic member that is disposed between the scintillator 11 and the imaging element 13 and guides the optical image generated at the scintillator 11 to the imaging element 13. In this case, the FOP 12 that is interposed between the scintillator 11 and the imaging element 13 functions as an X-ray shield and the X-ray amount of the X-rays made directly incident on the imaging element 13 is reduced. Thus together with the noise removal image process according to the above-described method, the influence of the noise image components in the X-ray observed image can be reduced further. However, such a fiber optic member does not have to be provided if it is unnecessary.

FIG. 6 is a diagram showing an example of an X-ray observed image (a) acquired by the X-ray imaging device 10, and a noise-removed image (b) with which the noise image components are removed from the X-ray observed image. These images (a) and (b) are X-ray observed images acquired by irradiation of X-rays onto the X-ray imaging device 10.

As shown in the image (a) of FIG. 6, with the X-ray observed image acquired by the X-ray imaging device 10, white, bright spot noise components, which are the noise image components, are distributed intermittently on the image. Meanwhile, with the image (b), with which the noise removal process has been performed by the above-described method, it can be understood that the bright spot noise is removed and the image quality is improved. Because the noise image components due to bright spot noise generally have high signal outputs, these can be discriminated clearly and removed by the above-described method without being buried within the noise level of the imaging element, the fluctuation of light emission amounts of the signal image components, etc.

Figure 7:
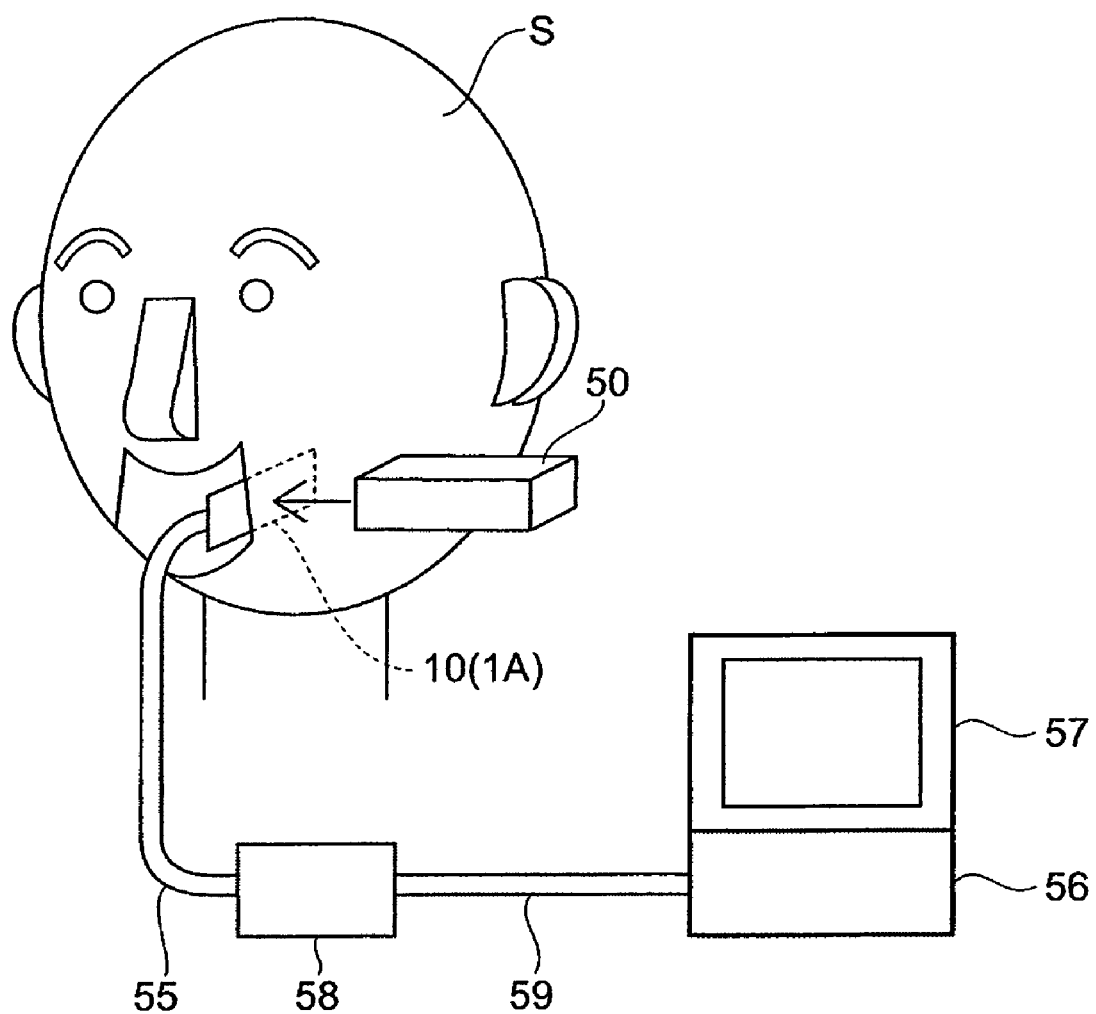
FIG. 7 is a diagram showing an example of a specific method of use of the X-ray imaging system shown in FIG. 1.

FIG. 7 is a diagram of an example of a specific method of use of the X-ray imaging system shown in FIG. 1. In this usage example, the X-ray imaging device 10 is positioned inside an oral cavity of an examinee that is to be the subject S and X-rays are irradiated from the X-ray source 50 toward the X-ray imaging device 10. Here, with the X-ray imaging device 10, the X-ray incident surface 11a of the scintillator 11 is positioned at the X-ray source 50 side.

An X-ray image corresponding to an image of the subject S is formed by a portion of the X-rays, emitted from the X-ray source 50, being absorbed by teeth, gum, etc., in the process of being incident on the oral cavity of the examinee. The X-ray observed image is acquired upon incidence of this X-ray image onto the X-ray imaging device 10. The image data of the acquired X-ray observed image are transmitted to an external processing device 56 by an output cable 55, a device 58 which includes the ADC 15 and the signal processing unit 20, and a USB cable 59. The processing device 56 also performs accumulation and storage of the transmitted image information or display, etc., of the image on a display device 57. Though the signal processing unit 20, which performs the noise removal process, etc., in the X-ray imaging system 1A of the arrangement shown in FIG. 1, is installed as the separate device 58 in the middle of the cable connecting the X-ray imaging device 10 and the external processing device 56 as shown in FIG. 7, an arrangement in which this unit is attached to the X-ray imaging device 10, an arrangement in which this unit is attached to the external processing device 56, or an arrangement in which this unit is realized as software in the external processing device 56 may be employed instead.

A second embodiment of an X-ray imaging method and an X-ray imaging system according to the present invention shall now be described.

Figure 8:
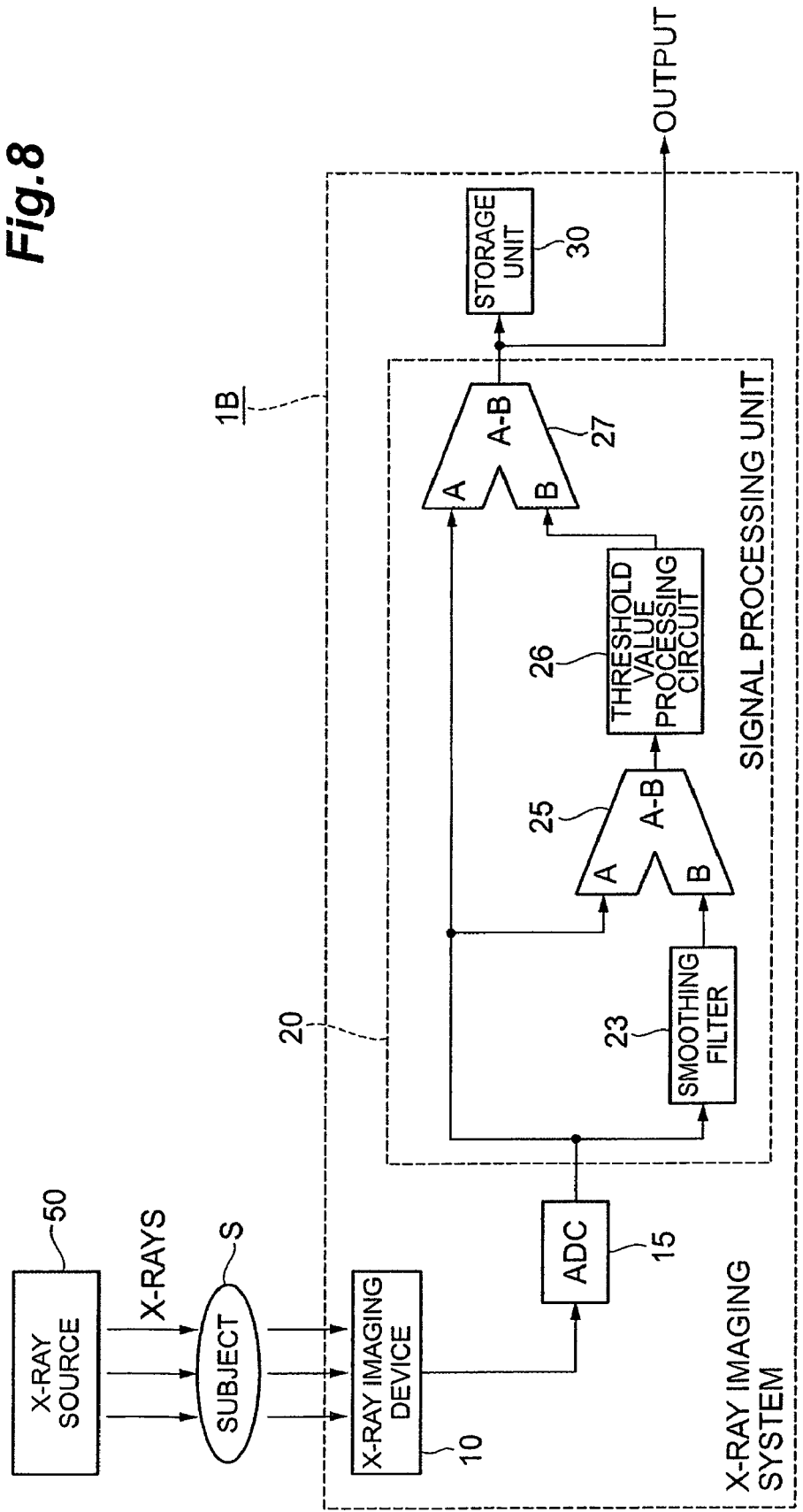
FIG. 8 is a block diagram showing an arrangement of a second embodiment of an X-ray imaging system.

FIG. 8 is a block diagram of an arrangement of the second embodiment of an X-ray imaging system. The X-ray imaging system 1B according to this embodiment has the X-ray imaging device 10, the signal processing unit 20, and the storage unit 30. Of these, the respective parts besides the signal processing unit 20 are the same in arrangement as those of the embodiment shown in FIG. 1.

In the present embodiment, the noise removal process performed on the X-ray observed image at the signal processing unit 20 is performed using a first X-ray observed image, acquired by the X-ray imaging device 10, and a second X-ray observed image, acquired by performing a smoothing process on the first X-ray observed image. In correspondence to such a noise removal method, the signal processing unit 20 shown in FIG. 8 has a smoothing filter 23, the first subtracter 25, the threshold value processing circuit 26, and the second subtracter 27.

The smoothing filter 23 is configured from a filter circuit, such as a median filter, and performs a smoothing process on the image data of the X-ray observed image acquired by the X-ray imaging device 10 to generate a smoothed image. The first subtracter 25 is subtraction processing means that uses input image signals of the X-ray observed image directly input from the ADC 15 as signals A and input image signals from the smoothing filter 23 as signals B and performs a subtraction process of A-B. The threshold value processing circuit 26 is threshold value processing means that performs a predetermined threshold value process on the subtracted image signals A-B output from the first subtracter 25. The second subtracter 27 is noise removal means that uses the directly input image signals of the X-ray observed image as signals A and input image signals from the threshold value processing circuit 26 as signals B and performs a subtraction process of A-B to perform noise removal.

Figure 9:
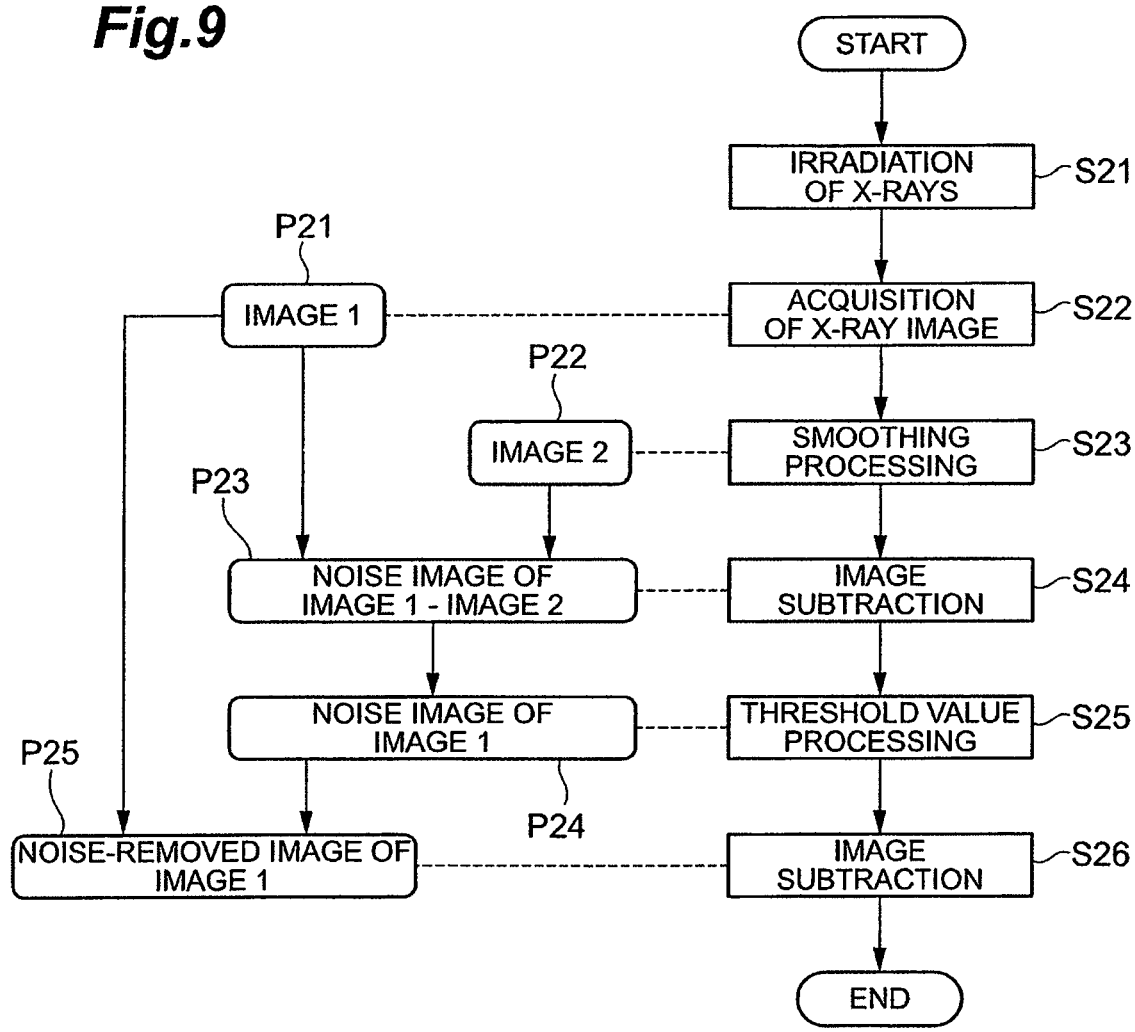
FIG. 9 is a flowchart showing a second embodiment of an X-ray imaging method.

A method for removing the noise in an X-ray observed image that is implemented in the X-ray imaging system 1B, shown in FIG. 8, shall now be described with reference to FIG. 9. FIG. 9 is a flowchart of another embodiment of an X-ray imaging method. FIG. 10 and FIG. 11 show schematic views of the noise removal method in the X-ray imaging method shown in FIG. 9.

In the X-ray imaging method shown in FIG. 9, first, the subject S (see FIG. 8) is irradiated with X-rays from the X-ray source 50 (step S21), and a first X-ray observed image P21 is acquired by means of the X-ray imaging device 10 (S22, first image acquisition step). As shown in (a) in FIG. 10, this first image P21 contains signal image components P21$s$, corresponding to the image of the subject S, and first noise image components P21$n$, due to X-rays that are made directly incident on the imaging element 13. The noise image components P21n are distributed intermittently on the image P21 as bright spot noise.

When the acquisition of the first X-ray observed image P21 is ended, the smoothing filter 23 performs a smoothing process on the first X-ray observed image P21 acquired as described above to acquire a second X-ray observed image P22, which is a smoothed image (S23, second image acquisition step). As shown in (b) in FIG. 10, this second image P22 contains signal image components P22s, corresponding to the image components P21s in the first image P21, and noise image components P22n, due to blurring of outlines of the signal image components by the smoothing process. Also, here, the noise image components P21n of bright spot noise in the first image P21 are removed by the smoothing.

The first subtracter 25 then performs a subtraction process of P21-P22 on the first image P21 and the second image P22, smoothed by the smoothing filter 23 (S24, subtraction processing step). In this process, the signal image components P21s and P22s that are contained in the images P21 and P22 are canceled out by the subtraction, with the exception of data fluctuation between the imagings, outline blurring due to the smoothing process, etc. A noise image P23, into which the noise image components of image 1—image 2 are extracted, is thus generated. As shown in (a) in FIG. 11, in the noise image P23, the first noise image components P21n are image components having positive intensity values (indicated by white pixels in the figure) and the second noise image components P22n are image components having negative intensity values (indicated by black pixels).

On intensity values of the respective pixels in such a noise image P23, the threshold value process is performed at the threshold value processing circuit 26 by setting an appropriate, positive intensity value as a threshold value for discriminating noise image components (S25, threshold value processing step). The second noise image components P22n, having negative intensity values in the noise image P23, and image components that contain just the fluctuation of the intensity values between respective imagings, etc., are thereby eliminated, and an image P24, into which the first noise image components P21n, having positive intensity values, are selectively extracted, is generated as shown in (b) in FIG. 11.

The second subtracter 27 then subtracts the first noise image components P21n (FIG. 11(b)), extracted at the threshold value processing circuit 26, from the first X-ray observed image P21 (FIG. 10(a)), containing the signal image components P21s and the first noise image components P21n. A noise-removed image P25, with which the noise image components P21n have been removed from the first X-ray observed image P21, is thereby obtained as shown in (c) in FIG. 11 (S26, noise removal step).

The effects of the X-ray imaging method and the X-ray imaging system according to the present embodiment shall now be described.

With the X-ray imaging method and the X-ray imaging system 1B shown in FIG. 8 to FIG. 11, the first and second X-ray observed images P21 and P22, which differ from each other in conditions concerning the noise image components, are acquired for the X-ray image of the imaging object. The subtraction process is then performed between the first and second X-ray observed images P21 and P22, the appropriate threshold value process is furthermore performed to selectively extract just the noise image components P21n contained in the first X-ray observed image P21, and the extracted noise image components P21n are subtracted from the original X-ray observed image P21. The noise-removed image, with which the effects of the noise image components due to X-rays made directly incident on the imaging element 13 are reduced, can thus be acquired favorably and efficiently as in the embodiment shown in FIG. 1.

Also, with the present embodiment, as the specific method of acquiring the second X-ray observed image P22 used for removing noise from the first X-ray observed image P21, the method of performing the smoothing process on the first X-ray observed image P21 to acquire the smoothed image that is to be the second X-ray observed image P22 is used. Even by such a method, the removal of noise from the X-ray observed image by the above-described method can be realized favorably.

Because, with such an arrangement, a single X-ray observed image is acquired and image processes are performed on this image to perform noise removal, image acquisition can be performed efficiently in a short imaging time. The signal image components P21s that are obtained in the final, noise-removed image are also those on which a smoothing process or other image process has not been performed. Thus, with respect to the original X-ray observed image, there is no degradation of resolution, etc., due to an image processing.

FIG. 12 is a diagram showing an example of an X-ray observed image (a), a smoothed image (b), and a noise-removed image (c) with which the noise image components are removed from the X-ray observed image.

As shown in the image (a) of FIG. 12, with the X-ray observed image acquired by the X-ray imaging device 10, white, bright spot noise components, which are the noise image components, are distributed intermittently on the image. Meanwhile, with the image (b), with which the smoothing process has been performed on the X-ray observed image, the abovementioned intermittently distributed bright spot noise components are removed by the smoothing. Slight blurring of outlines also occurs with the original image components in the image (b). On the other hand, with the image (c), with which the noise removal process has been performed by the above-described method, it can be understood that the bright spot noise is removed and the image quality is improved. Also, with the image (c), because the noise removal process is performed by using the image (a) prior to the smoothing process as an original image, the resolution of the image is not degraded.

The X-ray imaging method and the X-ray imaging system according to the present invention are not restricted to above-described embodiments and arrangement examples and various modifications are possible. For example, though in the above-described embodiment, the first noise image components are extracted by applying a positive threshold value to the noise image P13 (see FIG. 5) that contains the first noise image components P11n, having positive intensity values, and the second noise image components P12n, having negative intensity values, the present invention is not restricted to such a method and, for example, a method of extracting the noise image components by applying a negative threshold value may be used according to the specific method of performing the subtraction process on the first and second X-ray observed images, etc. Also, though the signal processing unit 20 that performs the noise removal process, etc., is installed as the separate device 58 in the middle of the cable connecting the X-ray imaging device 10 and the external processing device 56 in the arrangement example shown in FIG. 7, an arrangement in which this unit is attached to the X-ray imaging device 10, an arrangement in which this unit is attached to the external processing device 56, or an arrangement in which this unit is realized as software in the external processing device 56 may be employed instead as mentioned above.

Also, though in the above-described embodiments, the FOP 12 is disposed between the scintillator 11 and the imaging element 13 in the X-ray imaging device 10 for acquiring X-ray observed images, the above-described noise removal methods can likewise be applied to cases of using the X-ray imaging device 10 of an arrangement that is not provided with the FOP 12.

The present invention can be used as an X-ray imaging method and an X-ray imaging system that enable an X-ray observed image, corresponding to an incident X-ray image, to be acquired favorably in a state in which the effects of noise image components are reduced.

Here, the above-described X-ray imaging method (1) uses an X-ray imaging device including a scintillator, one surface of which is an X-ray incident surface and which generates scintillating light in accordance with incident X-rays to convert an X-ray image to an optical image, and an imaging element, which is disposed so as to face the other surface of the scintillator and detects the optical image generated by the scintillator to acquire an X-ray observed image corresponding to the X-ray image made incident on the scintillator, and has (2) a first image acquisition step of acquiring, by means of the X-ray imaging device, a first X-ray observed image that contains an image component, corresponding to the X-ray image converted to the optical image by the scintillator, and a first noise image component, due to X-rays made directly incident on the imaging element, (3) a second image acquisition step of acquiring a second X-ray observed image that contains a second noise image component differing from the first noise image component, (4) a subtraction processing step of performing a subtraction process between the first X-ray observed image and the second X-ray observed image to generate a noise image into which the noise image components are extracted, (5) a threshold value processing step of performing a threshold value process on the noise image to extract the first noise image component among the noise image components, and (6) a noise removal step of subtracting the first noise image component, extracted in the threshold value processing step, from the first X-ray observed image, containing the first noise image component, to generate a noise-removed image, with which the first noise image component is removed.

Also, the above-described X-ray imaging system includes: (a) an X-ray imaging device, including a scintillator, one surface of which is an X-ray incident surface and which generates scintillating light in accordance with incident X-rays to convert an X-ray image to an optical image, and an imaging element, which is disposed so as to face the other surface of the scintillator and detects the optical image generated by the scintillator to acquire an X-ray observed image corresponding to the X-ray image made incident on the scintillator, (b) subtraction processing means, performing a subtraction process between a first X-ray observed image, which is acquired by means of the X-ray imaging device and contains an image component, corresponding to the X-ray image converted to the optical image by the scintillator, and a first noise image component, due to X-rays made directly incident on the imaging element, and a second X-ray observed image, which is acquired so as to contain a second noise image component differing from the first noise image component, to generate a noise image, into which the noise image components are extracted; (c) threshold value processing means, performing a threshold value process on the noise image to extract the first noise image component among the noise image components; and (d) noise removal means, subtracting the first noise image component, extracted by the threshold value processing means, from the first X-ray observed image, containing the first noise image component, to generate a noise-removed image, with which the first noise image component is removed.

Here, as a specific method for acquiring the second X-ray observed image used for noise removal from the first X-ray observed image, preferably with the X-ray imaging method, the second X-ray observed image, containing an image component, corresponding to the X-ray image converted to the optical image by the scintillator, and the second noise image component, due to X-rays made directly incident on the imaging element, is acquired by the X-ray imaging device in the second image acquisition step.

Likewise, the X-ray imaging system preferably uses an X-ray observed image, acquired by the X-ray imaging device to contain an image component, corresponding to the X-ray image converted to the optical image by the scintillator, and the second noise image component, due to X-rays made directly incident on the imaging element, as the second X-ray observed image in the subtraction processing means.

Or preferably with the X-ray imaging method, the second X-ray observed image is acquired in the second image acquisition step by performing a smoothing process on the first X-ray observed image acquired in the first image acquisition step.

Likewise, the X-ray imaging system preferably uses an X-ray observed image, acquired by performing a smoothing process on the first X-ray observed image, as the second X-ray observed image in the subtraction processing means.

The X-ray imaging device, used for acquisition of the X-ray observed images, preferably has a fiber optic member that is disposed between the scintillator and the imaging element and guides the optical image, generated at the scintillator to the imaging element. In this case, the X-ray amount of the X-rays made directly incident on the imaging element is reduced by the fiber optic member interposed between the scintillator and the imaging element. Thus together with the above-described noise removal image process, the influence of the noise image component in the X-ray observed image can be reduced further.

What is claimed is:

1. An X-ray imaging method using an X-ray imaging device for acquiring an image of a subject, the X-ray imaging device including a scintillator, one surface of which is an X-ray incident surface and which generates scintillating light in accordance with incident X-rays to convert an X-ray image to an optical image, and an imaging element, which is disposed so as to face the other surface of the scintillator and detects the optical image generated by the scintillator to acquire an X-ray observed image corresponding to the X-ray image made incident on the scintillator, the method comprising:

a first image acquisition step of acquiring, by means of the X-ray imaging device, a first X-ray observed image that contains an image component, corresponding to the X-ray image of the subject converted to the optical image by the scintillator, and a first noise image component, due to X-rays made directly incident on the imaging element;

a second image acquisition step of acquiring a second X-ray observed image that contains a second noise image component differing from the first noise image component;

a subtraction processing step of performing a subtraction process between the first X-ray observed image and the second X-ray observed image to generate a noise image into which the noise image components are extracted;

a threshold value processing step of performing a threshold value process on the noise image to extract the first noise image component among the noise image components; and a noise removal step of subtracting the first noise image component, extracted in the threshold value processing step, from the first X-ray observed image that contains the first noise image component to generate a noise-removed image, with which the first noise image component is removed; wherein in the first image acquisition step, the first X-ray observed image is acquired under the condition that the subject is irradiated with X-rays from an X-ray source, and in the second image acquisition step, the second X-ray observed image that contains an image component, corresponding to the X-ray image of the subject converted to the optical image by the scintillator, and the second noise image component, due to X-rays made directly incident on the imaging element, is acquired by means of the X-ray imaging device under the condition that the subject is irradiated with X-rays from the X-ray source.

2. The X-ray imaging method according to claim 1, wherein the X-ray imaging device has a fiber optic member that is disposed between the scintillator and the imaging element and guides the optical image, generated at the scintillator, to the imaging element.

3. An X-ray imaging system comprising:

an X-ray imaging device for acquiring an image of a subject, including a scintillator, one surface of which is an X-ray incident surface and which generates scintillating light in accordance with incident X-rays to convert an X-ray image to an optical image, and an imaging element, which is disposed so as to face the other surface of the scintillator and detects the optical image generated by the scintillator to acquire an X-ray observed image corresponding to the X-ray image made incident on the scintillator;

subtraction processing means, performing a subtraction process between a first X-ray observed image, which is acquired by means of the X-ray imaging device and contains an image component, corresponding to the X-ray image of the subject converted to the optical image by the scintillator, and a first noise image component, due to X-rays made directly incident on the imaging element, and a second X-ray observed image, which is acquired so as to contain a second noise image component differing from the first noise image component, to generate a noise image, into which the noise image components are extracted;

threshold value processing means, performing a threshold value process on the noise image to extract the first noise image component among the noise image components; and noise removal means, subtracting the first noise image component, extracted by the threshold value processing means, from the first X-ray observed image that contains the first noise image component to generate a noise-removed image, with which the first noise image component is removed; wherein in the subtraction processing means, an X-ray observed image, acquired under the condition that the subject is irradiated with X-rays from an X-ray source, is used as the first X-ray observed image, and an X-ray observed image, acquired by means of the X-ray imaging device under the condition that the subject is irradiated with X-rays from the X-ray source, and containing an image component, corresponding to the X-ray image of the subject converted to the optical image by the scintillator, and the second noise image component, due to X-rays made directly incident on the imaging element, is used as the second X-ray observed image.

4. The X-ray imaging system according to claim 3, wherein the X-ray imaging device has a fiber optic member that is disposed between the scintillator and the imaging element and guides the optical image, generated at the scintillator, to the imaging element.

* * * * *